UNITED STATES PATENT OFFICE.

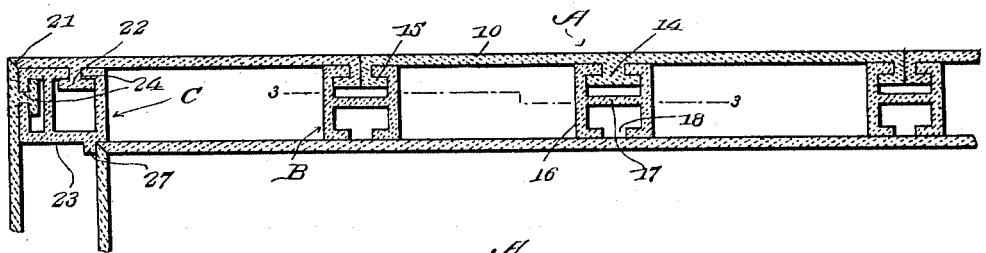
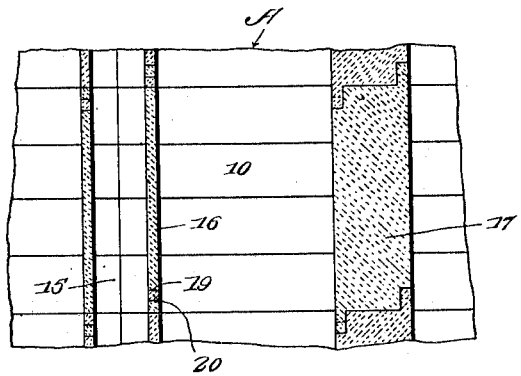
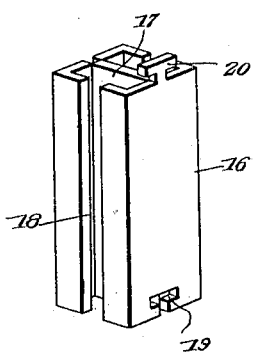
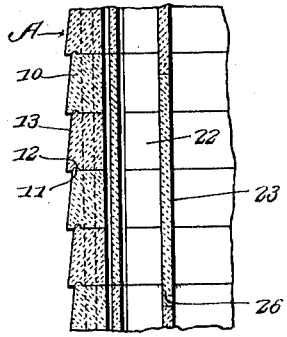
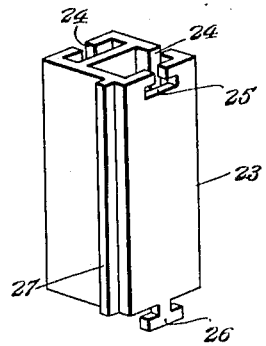

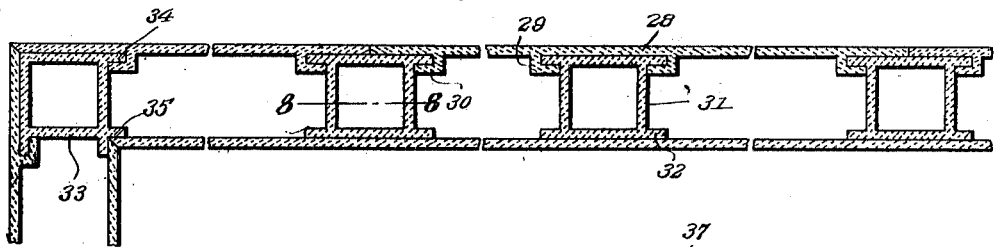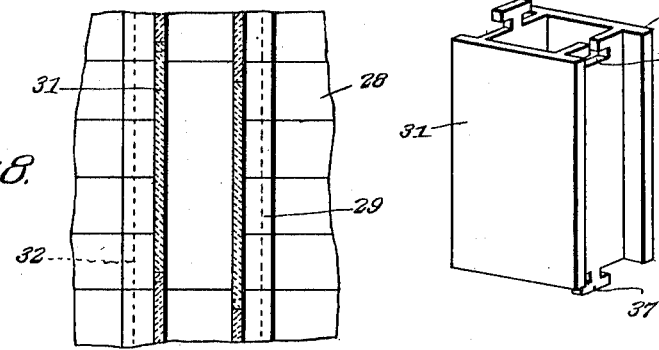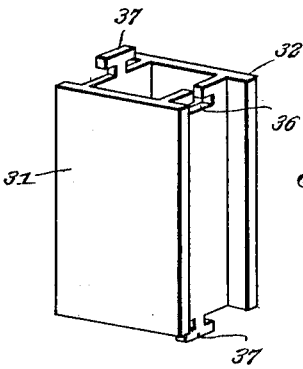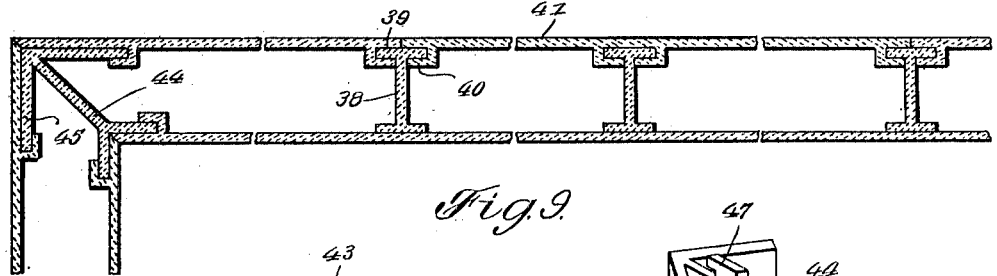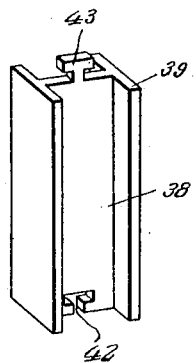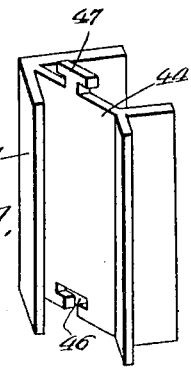

JOHN O. DAVISON, OF MEMPHIS, TENNESSEE.

CONCRETE CONSTRUCTION.

1,116,391. Specification of Letters Patent. Patented Nov. 10, 1914.

Application filed January 10, 1914. Serial No. 811,457.

*To all whom it may concern:*

Be it known that I, JOHN O. DAVISON, a citizen of the United States, residing at Memphis, in the county of Shelby and State of Tennessee, have invented new and useful Improvements in Concrete Construction, of which the following is a specification.

The invention relates to building construction and more particularly to the class of interlocking concrete construction.

The primary object of the invention is the provision of a concrete construction wherein the walls and studding can be readily and easily locked together, without the use of nails or other fasteners nor the necessity of the use of tools, thereby avoiding the expense of labor and the ordinary waste of materials.

Another object of the invention is the provision of a building construction wherein the same is rendered positively damp-proof, fire-proof and practically air-tight and which can be readily razed without damage to the materials so that the latter can be again used in erecting edifices thus being practically indestructible.

A further object of the invention is the provision of a building construction wherein the development of an edifice is unlimited, the concrete sections and studding being interlocked in a novel manner to insure strength and durability.

A still further object of the invention is the provision of a building construction which is similar in construction, the parts of which can be conveniently molded and also one which is inexpensive to erect.

With these and other objects in view the invention consists in the construction, combination and arrangement of parts as will be hereinafter more fully described, illustrated in the accompanying drawing forming a part of this application and pointed out in the claims hereunto appended.

In the drawings: Figure 1 is a fragmentary horizontal sectional view through the outer wall and the studding of a building constructed in accordance with the invention. Fig. 2 is a perspective view of one section of the studding thereof. Fig. 3 is a sectional view on the line 3—3 of Fig. 1. Fig. 4 is a perspective view of the corner studding. Fig. 5 is a vertical sectional view thereof and showing the weather boarding applied. Fig. 6 is a horizontal sectional view of a modified form of outer wall and studding. Fig. 7 is a perspective view of one section of the studding. Fig. 8 is a fragmentary vertical sectional view on the line 8—8 of Fig. 6. Fig. 9 is a view similar to Fig. 6 showing a still further modification. Fig. 10 is a perspective view of one section of the studding. Fig. 11 is a perspective view of the corner studding.

Similar reference characters indicate corresponding parts throughout the several views in the drawing.

Referring to the drawings in detail A designates the outer wall and B the side studding and C the corner studding, each being constructed in a manner hereinafter more fully described.

The outer wall A is made from the required number of weather boards 10 each being of the desired length and preferably formed from concrete having provided on its upper longitudinal edge a tongue 11, while in the lower longitudinal edge is a groove 12 which is correspondingly shaped with respect to the tongue so as to receive the latter of another board when spaced in position and adjacent thereto, the outer surfaces of these boards being inclined as at 13 so as to present the appearance at the outside of the wall of the ordinary weather boarding.

Formed on the inner face of the board 10 at a medial point thereof is a T-shaped locking rib 14 while at the ends of the said board are L-shaped locking flanges 15 for locking engagement with the studding in a manner presently described.

The studding comprises a rectangular shaped column which is made in sections 16 formed with a longitudinal center web 17 while in a pair of the opposite sides of said sections are medial slots 18 which receive either the ribs 14 or the flanges 15 on the boards 10 for the securing thereof to the studding and also for connecting the boards together in longitudinal alinement with each other. The remaining pair of sides of the section 16 at respective ends thereof are formed with a T-shaped slot and a T-shaped tongue 19 and 20 respectively so that on stacking the sections upon each other they will be interlocked with one another and the boards of the wall will be united together.

The corner ends of the boards 10 are formed with bevels 21 to assure a close joint and a sharp corner. Provided on the inner faces of the said boards 10 spaced from the corner ends are T-shaped ribs 22 for locking engagement with the corner studding C which comprises a rectangular shaped column made from a plurality of hollow sections 23 formed with slots 24 in adjacent faces to receive the ribs 22, the ends of the sections 23 being provided with the T-shaped slot and T-shaped tongue 24 and 26 respectively for the interlocking of the sections together throughout the length of the column. The corner sections 23 are formed with an abutment shoulder 27 which serves as a back for the lathing or inner walls of the building.

In Figs. 6, 7 and 8 there is shown a modified form of wall and studding wherein the boards 28 constituting the wall are each formed with intermediate L-shaped flanges 29 and outer L-shaped flanges 30 for locking engagement with the side and corner studding. Each side studding comprises a hollow column formed from rectangular shaped sections 31 having lateral extending corner flanges 32 which are adapted to engage with either flanges 29 or 30 as shown in Fig. 6 of the drawing so that the studding will be fastened to the boards 28 in erecting the building. The corner studding comprises a column formed from hollow rectangular shaped sections 33 provided with laterally extending corner flanges 34 and a triangular shaped corner flange 35 respectively, the flanges 34 being designed to engage in the flanges 30 of the boards 28 while the flanges 35 serve as bearings for the lathing or inner wall of the building. These sections 32 and 33 of the side and corner studding have formed in each end thereof a T-shaped slot 36 and a T-shaped tongue 37 so that the latter on one section will engage in the slot 36 on another section adjacent thereto for the interlocking of the same.

In Figs. 9, 10 and 11 there is shown a still further modification of studding for the side and corner of the building, the side studding comprising a substantially I-shaped beam 38, the flanges 39 of which are adapted to engage the L-shaped flanges 40 on the boards 41 of the wall, the opposite end of the bar 38 being provided with a T-shaped slot 42 and a T-shaped tongue 43 so that the sections of the studding will interlock with each other. The corner studding is made in a plurality of sections which comprise a straight medial web 44 with outwardly diverging flanges 45 at the inner and outer longitudinal edges and these flanges 45 engage the L-shaped flanges 40 on the boards 41 constituting the wall as shown in Fig. 9 of the drawing for the locking of the boards and studding together, the web 44 of the section being formed at opposite ends with a T-shaped slot and a T-shaped tongue 46 and 47 respectively whereby the sections of the studding can be interlocked with each other.

From the foregoing it is thought that the construction and operation of the invention will be clearly understood and therefore a more extended explanation has been omitted.

What is claimed is:—

1. In building construction, a plurality of weather boards, and studding detachably connected to the weather boards and also connecting the latter together, the said studding being formed in a plurality of sections, one end of each section being formed with a T-shaped slot, and a T-shaped tongue at the opposite end of the section whereby the sections of the studding will be interlocked with each other.

2. In building construction, a sectional outer wall, locking ribs formed on the inner faces of the sections of the wall, a studding formed from a plurality of sections, the said sections of the studding being detachably engaged with the locking ribs, and interlocking connections between the sections of the studding.

In testimony whereof I affix my signature in the presence of two witnesses.

JOHN O. DAVISON.

Witnesses:
J. D. CELLA,
FRED C. PENDERGRAST.